(12) United States Patent
Nakatsutsumi et al.

(10) Patent No.: US 11,799,067 B2
(45) Date of Patent: Oct. 24, 2023

(54) BATTERY

(71) Applicant: PANASONIC INTELLECTUAL PROPERTY MANAGEMENT CO., LTD., Osaka (JP)

(72) Inventors: Takayuki Nakatsutsumi, Osaka (JP); Ryuichi Natsui, Osaka (JP); Nobuhiko Hojo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 132 days.

(21) Appl. No.: 17/022,921

(22) Filed: Sep. 16, 2020

(65) Prior Publication Data
US 2020/0411849 A1 Dec. 31, 2020

Related U.S. Application Data

(63) Continuation of application No. 15/813,204, filed on Nov. 15, 2017, now Pat. No. 10,811,672, which is a continuation of application No. PCT/JP2016/003951, filed on Aug. 30, 2016.

(30) Foreign Application Priority Data

Sep. 16, 2015 (JP) .................. 2015-182643

(51) Int. Cl.
| | |
|---|---|
| *H01M 4/1315* | (2010.01) |
| *H01M 4/505* | (2010.01) |
| *H01M 4/525* | (2010.01) |
| *H01M 10/0567* | (2010.01) |
| *H01M 10/0568* | (2010.01) |
| *H01M 10/0569* | (2010.01) |
| *H01M 10/052* | (2010.01) |
| *C01G 45/00* | (2006.01) |
| *C01G 51/00* | (2006.01) |
| *C01G 53/00* | (2006.01) |
| *H01M 4/485* | (2010.01) |
| *H01M 10/0525* | (2010.01) |
| *H01M 4/02* | (2006.01) |

(52) U.S. Cl.
CPC .......... *H01M 4/1315* (2013.01); *C01G 45/00* (2013.01); *C01G 45/006* (2013.01); *C01G 51/00* (2013.01); *C01G 51/006* (2013.01); *C01G 53/00* (2013.01); *C01G 53/006* (2013.01); *H01M 4/485* (2013.01); *H01M 4/505* (2013.01); *H01M 4/525* (2013.01); *H01M 10/052* (2013.01); *H01M 10/0525* (2013.01); *H01M 10/0567* (2013.01); *H01M 10/0568* (2013.01); *H01M 10/0569* (2013.01); *C01P 2002/54* (2013.01); *C01P 2002/72* (2013.01); *C01P 2002/76* (2013.01); *C01P 2006/40* (2013.01); *H01M 2004/028* (2013.01); *H01M 2220/30* (2013.01); *H01M 2300/0025* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 6,037,095 A | 3/2000 | Miyasaka | |
| 6,416,902 B1 | 7/2002 | Miyasaka | |
| 6,872,491 B2 | 3/2005 | Kanai et al. | |
| 7,429,434 B2 | 9/2008 | Mihara et al. | |
| 8,741,484 B2 | 6/2014 | Karthikeyan et al. | |
| 9,178,249 B2 | 11/2015 | Amine et al. | |
| 10,811,672 B2 * | 10/2020 | Nakatsutsumi ... | H01M 10/0567 |
| 2002/0022183 A1 | 2/2002 | Ogawa et al. | |
| 2002/0055042 A1 | 5/2002 | Kweon et al. | |
| 2004/0202938 A1 | 10/2004 | Noguchi et al. | |
| 2004/0229123 A1 | 11/2004 | Takahashi et al. | |
| 2005/0084757 A1 | 4/2005 | Kweon et al. | |
| 2009/0136854 A1 | 5/2009 | Nakura | |
| 2009/0202892 A1 | 8/2009 | Inagaki et al. | |

(Continued)

FOREIGN PATENT DOCUMENTS

| | | |
|---|---|---|
| CN | 103928672 A | 7/2014 |
| EP | 2921455 A1 | 9/2015 |

(Continued)

OTHER PUBLICATIONS

Written Opinion for Japanese Patent Application No. 2017-540475, dated Sep. 1, 2020; with English translation.

(Continued)

*Primary Examiner* — Laura Weiner

(74) *Attorney, Agent, or Firm* — McDermott Will & Emery LLP

(57) ABSTRACT

A battery includes a positive electrode including a positive electrode active material, a negative electrode, and an electrolytic solution including an additive. The positive electrode active material includes a compound having a crystal structure belonging to a space group FM3-M and represented by Compositional Formula (1): $Li_xMe_yO_\alpha F_\beta$, where, Me is one or more elements selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr; and subscripts x, y, α, and β satisfy the following requirements: $1.7 \leq x \leq 2.2$, $0.8 \leq y \leq 1.3$, $1 \leq \alpha \leq 2.5$, and $0.5 \leq \beta \leq 2$. The additive is at least one selected from dinitrile compounds and diisocyanate compounds.

14 Claims, 4 Drawing Sheets

(56) References Cited

U.S. PATENT DOCUMENTS

| | | |
|---|---|---|
| 2010/0086854 A1 | 4/2010 | Kumar et al. |
| 2011/0247321 A1 | 10/2011 | Streeter et al. |
| 2011/0294019 A1 | 12/2011 | Amine et al. |
| 2013/0136987 A1 | 5/2013 | Uehara et al. |
| 2013/0209871 A1 | 8/2013 | Kato et al. |
| 2013/0266868 A1 | 10/2013 | Sun et al. |
| 2014/0099549 A1 | 4/2014 | Ceder et al. |
| 2014/0127583 A1 | 5/2014 | Han et al. |
| 2014/0162127 A1 | 6/2014 | Kim et al. |
| 2014/0205913 A1 | 7/2014 | Park et al. |
| 2014/0272607 A1 | 9/2014 | Amine et al. |
| 2015/0010819 A1 | 1/2015 | Lee et al. |
| 2015/0090924 A1 | 4/2015 | Lee et al. |
| 2015/0093646 A1 | 4/2015 | Kawada |
| 2015/0214550 A1 | 7/2015 | Song et al. |
| 2015/0228970 A1 | 8/2015 | Song et al. |
| 2015/0380768 A1 | 12/2015 | Mizuno et al. |
| 2016/0013517 A1 | 1/2016 | Nakazawa et al. |
| 2016/0049640 A1 | 2/2016 | Takeuchi et al. |
| 2016/0372747 A1 | 12/2016 | Rolff et al. |
| 2017/0005332 A1 | 1/2017 | Chen et al. |
| 2017/0207444 A1 | 7/2017 | Yanagihara et al. |
| 2019/0088940 A1 | 3/2019 | Ceder et al. |

FOREIGN PATENT DOCUMENTS

| | | |
|---|---|---|
| JP | H01-209663 A | 8/1989 |
| JP | H07-037617 A | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | H11-339800 A | 12/1999 |
| JP | H11-345615 A | 12/1999 |
| JP | 2000-012031 A | 1/2000 |
| JP | 2000-260433 A | 9/2000 |
| JP | 2001-516492 A | 9/2001 |
| JP | 2002-015776 A | 1/2002 |
| JP | 2003-229130 A | 8/2003 |
| JP | 3578066 B2 | 10/2004 |
| JP | 2004-311408 A | 11/2004 |
| JP | 2004-349132 A | 12/2004 |
| JP | 2005-063953 A | 3/2005 |
| JP | 2006-261127 A | 9/2006 |
| JP | 2006-278341 A | 10/2006 |
| JP | 2007-018874 A | 1/2007 |
| JP | 2008-124038 A | 5/2008 |
| JP | 2009-187834 A | 8/2009 |
| JP | 2011-018656 A | 1/2011 |
| JP | 2012-014851 A | 1/2012 |
| JP | 2012-038564 A | 2/2012 |
| JP | 2012-156046 A | 8/2012 |
| JP | 2013-222612 A | 10/2013 |
| JP | 2014-022191 A | 2/2014 |
| JP | 2014-116308 A | 6/2014 |
| JP | 2015-022958 A | 2/2015 |
| JP | 2015-069754 A | 4/2015 |
| JP | 2015-111551 A | 6/2015 |
| JP | 2015-118892 A | 6/2015 |
| JP | 2015-128023 A | 7/2015 |
| JP | 2015-159109 A | 9/2015 |
| JP | 2016-033902 A | 3/2016 |
| WO | 1997/044842 A1 | 11/1997 |
| WO | 2012/014846 A1 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 A1 | 10/2014 |
| WO | 2014/157591 A1 | 10/2014 |

OTHER PUBLICATIONS

Notice of Allowance issued in U.S. Appl. No. 15/813,212, dated May 1, 2020.
Notice of Allowance issued in U.S. Appl. No. 15/813,218, dated May 4, 2020.
Notice of Allowance issued in U.S. Appl. No. 15/814,874, dated May 1, 2020.
International Search Report of PCT application No. PCT/JP2016/003951 dated Nov. 1, 2016.
International Search Report of PCT application No. PCT/JP2016/003953 dated Dec. 6, 2016.
International Search Report of PCT application No. PCT/JP2016/003952 dated Nov. 1, 2016.
ICSD Details on Search Result for Lit (Mn O3), printed on Feb. 4, 2020.
Coban, Hüseyin Can Çoban, "Metal Oxide (SnO2) Modified LiNi0.8Co0.2O2 Cathode Material for Lithium Ion Batteries," M.Sc. Thesis, Department of Nano Science and Nano Engineering, Nano Science and Nano Engineering Programme, Istanbul Technical University Graduate School of Science Engineering and Technology. May 2014.
The Extended European Search Report dated Jun. 1, 2018 for the related European Patent Application No. 16827416.5.
Ayuko Kitajou et al: "Electrochemical Performance of a Novel Cathode material "LiFeOF" for Li-ion Batteries", Electrochemistry, vol. 83, No. 10, Jan. 1, 2015 (jan. 1, 2015), pp. 885-888, XP055416459.
International Search Report of PCT application No. PCT/JP2016/003215 dated Sep. 20, 2016.
International Search Report of PCT application No. PCT/JP2017/027997 dated Sep. 26, 2017.
International Search Report of PCT application No. PCT/JP2016/003954 dated Dec. 6, 2016.
International Search Report of PCT application No. PCT/JP2016/003949 dated Nov. 29, 2016.
International Search Report of PCT application No. PCT/JP2016/003955 dated Dec. 6, 2016.
International Search Report of PCT application No. PCT/JP2016/003948 dated Nov. 29, 2016.
International Search Report of PCT application No. PCT/JP2016/003950 dated Nov. 29, 2016.
International Search Report of PCT application No. PCT/JP2017/026210 dated Oct. 17, 2017.
M. Holzapfel et al., "Lithium-Ion Conductors of the System LiCo1—xFexO2, Preparation and Structural Investigation," Journal of Solid State Chemistry, 2001, 156, pp. 470-479.
S. Muhammad et al., "Deciphering the thermal behavior of lithium rich cathode material by in situ X-ray diffraction technique," Journal of Power Sources, 2015, 285, pp. 156-160.
International Search Report of PCT application No. PCT/JP2016/003956 dated Dec. 6, 2016.
Non-Final Office Action issued in U.S. Appl. No. 15/821,749, dated Jan. 16, 2020.
Notice of Allowance issued in U.S. Appl. No. 15/821,749, dated Apr. 15, 2020.
Non-Final Office Action issued in U.S. Appl. No. 15/821,745, dated Dec. 10, 2019.
Notice of Allowance issued in U.S. Appl. No. 15/821,745, dated Apr. 8, 2020.
Non-Final Office Action issued in U.S. Appl. No. 15/813,210, dated Jan. 2, 2020.
Non-Final Office Action issued in U.S. Appl. No. 15/813,204, dated Dec. 17, 2019.
Notice of Allowance issued in U.S. Appl. No. 15/813,204, dated Apr. 9, 2020.
Non-Final Office Action issued in U.S. Appl. No. 15/814,874, dated Jan. 2, 2020.
Non-Final Office Action issued in U.S. Appl. No. 15/811,685, dated Dec. 3, 2019.
Notice of Allowance issued in U.S. Appl. No. 15/811,685, dated Apr. 9, 2020.
Non-Final Office Action issued in U.S. Appl. No. 16/278,701, dated Aug. 27, 2019.
Non-Final Office Action issued in U.S. Appl. No. 16/278,701, dated Dec. 10, 2019.
Final Office Action issued in U.S. Appl. No. 16/278,701, dated Apr. 16, 2020.

(56) References Cited

OTHER PUBLICATIONS

Non-Final Office Action issued in U.S. Appl. No. 15/813,212, dated Dec. 31, 2019.
Non-Final Office Action issued in U.S. Appl. No. 15/811,683, dated Nov. 15, 2018.
Final Office Action issued in U.S. Appl. No. 15/811,683, dated Apr. 18, 2019.
Notice of Allowance issued in U.S. Appl. No. 15/811,683, dated Aug. 19, 2019.
Non-Final Office Action issued in U.S. Appl. No. 15/811,684, dated Dec. 5, 2019.
Final Office Action issued in U.S. Appl. No. 15/811,684, dated Mar. 13, 2020.
Notice of Allowance issued in U.S. Appl. No. 15/811,684, dated Apr. 8, 2020.
Non-Final Office Action issued in U.S. Appl. No. 15/838,360, dated Feb. 10, 2020.
Non-Final Office Action issued in U.S. Appl. No. 15/844,626, dated Mar. 18, 2020.
Non-Final Office Action issued in U.S. Appl. No. 15/813,218, dated Jan. 16, 2020.
Non-Final Office Action issued in U.S. Appl. No. 15/702,632, dated Jun. 17, 2019.
Non-Final Office Action issued in U.S. Appl. No. 15/702,632, dated Nov. 26, 2019.
Final Office Action issued in U.S. Appl. No. 15/702,632, dated Aug. 23, 2019.
Notice of Allowance issued in U.S. Appl. No. 15/702,632, dated Apr. 20, 2020.
Non-Final Office Action issued in U.S. Appl. No. 15/838,360, dated Apr. 22, 2020.
Notice of Allowance issued in U.S. Appl. No. 15/813,210, dated Apr. 22, 2020.
Shuhua Ren et al., Improved Voltage and Cycling for Intercalation in High-Capacity Disordered Oxyfluoride Cathodes, Advanced Science, Jun. 12, 2015, vol. 2, Issue 10, 1500128.
English Translation of Chinese Search Report dated Jul. 13, 2020 for the related Chinese Patent Application No. 201680013989.7.
Synthesis and electrochemistry of cubic rocksalt Li—Ni—Ti—O compounds in the phase diagram of $LiNiO_2$—$LiTiO_2$—$Li[Li1/3Ti2/3]O_2$, Lianqi Zhang, et al Journal of power Sourses, 185(2008), p. 534-p. 541.

\* cited by examiner

BATTERY

CROSS-REFERENCE OF RELATED APPLICATIONS

This application is a Continuation of U.S. patent application Ser. No. 15/813,204, filed on Nov. 15, 2017, which is a Continuation of International Patent Application No. PCT/JP2016/003951, filed on Aug. 30, 2016, which in turn claims the benefit of Japanese Application No. 2015-182643, filed on Sep. 16, 2015, the entire disclosures of which Applications are incorporated by reference herein.

BACKGROUND

1. Technical Field

The present disclosure relates to a battery.

2. Description of the Related Art

Japanese Unexamined Patent Application Publication No. 7-037617 discloses a positive electrode active material having a crystal structure belonging to a space group R3-M and represented by the formula $Li_wM_xO_yX_z$ (where M represents Co, Ni, Mn, V, Fe, or Ti; X represents at least one halogen element; and $0.2 \leq w \leq 2.5$, $0.8 \leq x \leq 1.25$, $1 \leq y \leq 2$, and $0 < z \leq 1$).

SUMMARY

One non-limiting and exemplary embodiment provides a battery having high reliability, which has been demanded in existing technology.

In one general aspect, the techniques disclosed here feature a battery including a positive electrode including a positive electrode active material, a negative electrode, and an electrolytic solution including an additive. The positive electrode active material includes a compound having a crystal structure belonging to a space group FM3-M and represented by Compositional Formula (1): $Li_xMe_yO_\alpha F_\beta$, where Me represents one or more elements selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr; and the following requirements: $1.7 \leq x \leq 2.2$, $0.8 \leq y \leq 1.3$, $1 \leq \alpha \leq 2.5$, and $0.5 \leq \beta \leq 2$ are satisfied. The additive is at least one selected from dinitrile compounds and diisocyanate compounds.

The present disclosure can achieve a battery having high reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
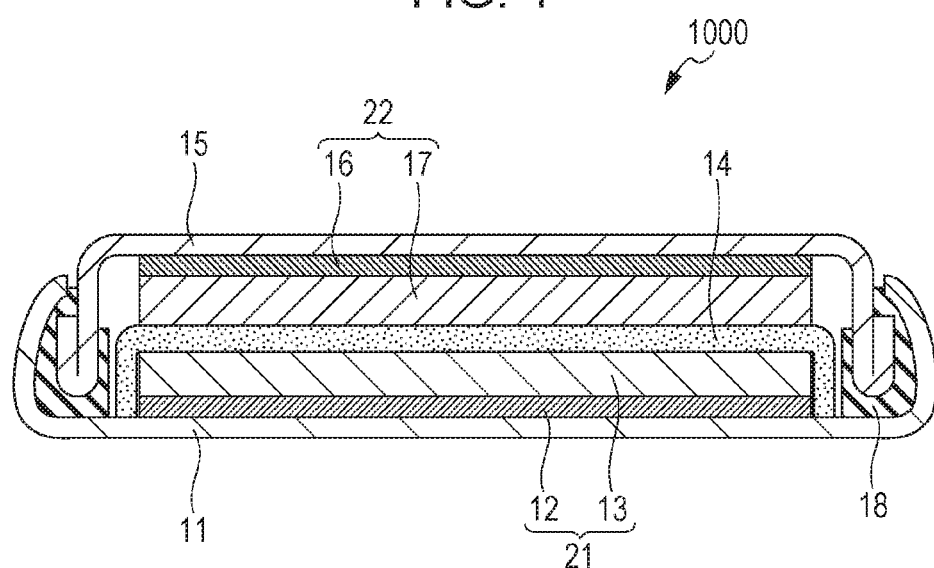
FIG. 1 is a cross-sectional view illustrating a schematic structure of an example of the battery according to Embodiment 1.

Embodiments of the present disclosure will now be described.

Embodiment 1

The batter according to Embodiment 1 includes a positive electrode, a negative electrode, and an electrolytic solution.

The positive electrode includes a positive electrode active material.

The electrolytic solution includes an additive.

The positive electrode active material includes a compound having a crystal structure belonging to a space group FM3-M and represented by Compositional Formula (1):

$$Li_xMe_yO_\alpha F_\beta \qquad (1)$$

In Formula (1), Me represents at least one selected from the group consisting of Mn, Co, Ni, Fe, A, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr (i.e., one or more elements selected from the group).

In Formula (1), subscripts x, y, α, and β satisfy the following requirements:

$1.7 \leq x \leq 2.2$,
$0.8 \leq y \leq 1.3$,
$1 \leq \alpha \leq 2.5$, and
$0.5 \leq \beta \leq 2$.

The additive is at least one selected from dinitrile compounds and diisocyanate compounds.

The structure described above prevents occurrence of a side reaction at the interface between the electrolytic solution and the positive electrode active material represented by Compositional Formula (1). Accordingly, the reliability (e.g., discharge efficiency) of the battery can be enhanced.

Some electrolytic solutions that have been used are those prepared by dissolving lithium salts in nonaqueous solvent mixtures of cyclic carbonates and linear carbonates. In a charging operation of a lithium secondary battery, $Li^+$ is extracted from the positive electrode active material. As a result, the oxidizability of the positive electrode active material is enhanced. Accordingly, in a battery including a known positive electrode active material (e.g., active material having a layered structure defined by a space group R3-M, such as $LiCoO_2$ and $LiMnO_2$) and a known electrolytic solution described above, a side reaction readily occurs at the interface between the positive electrode active material and the electrolytic solution. Consequently, if a large amount of Li is extracted, the reliability of the battery is reduced.

In contrast, the battery including an electrolytic solution and a positive electrode active material according to Embodiment 1 can prevent occurrence of a side reaction. The factors thereof are probably as follows.

That is, each of the dinitrile compounds and the diisocyanate compounds as the additive of the electrolytic solution according to Embodiment 1 has two nitrile groups or isocyanate groups having high donor properties. The two nitrile groups or isocyanate groups specifically adhere to the surface of the positive electrode active material of Embodiment 1. It is believed that as a result, the active site for the side reaction of the surface of the positive electrode active material of Embodiment 1 is prevented from being in contact with the electrolytic solution and that the side reaction is therefore prevented from occurring.

The structure according to Embodiment 1 can achieve a high-capacity battery.

For example, a lithium ion battery including the positive electrode active material containing the above-mentioned compound has a redox potential (Li/Li$^+$ reference) of about 3.3 V and a capacity of about 220 mAh/g or more.

In the above-mentioned compound when subscript x in Compositional Formula (1) is smaller than 1.7, the usable amount of Li is small, leading to an insufficient capacity.

In the above-mentioned compound when subscript x in Compositional Formula (1) is larger than 2.2 (in other words, when subscript y is smaller than 0.8), the amount of the transition metal usable for the redox reaction is reduced. As a result, a large amount of oxygen is used in the redox reaction, leading to unstabilization of the crystal structure and an insufficient capacity.

In the above-mentioned compound when subscript $\alpha$ in Compositional Formula (1) is smaller than 1 (in other words, when subscript $\beta$ is larger than 2), the influence of F having high electronegativity is high. As a result, the electron conductivity decreases, and the capacity becomes insufficient.

In the above-mentioned compound when subscript $\alpha$ in Compositional Formula (1) is larger than 2.5 (in other words, when subscript $\beta$ is smaller than 0.5), the influence of F having high electronegativity is low. As a result, the cation-anion interaction is reduced. Consequently, the structure is unstabilized when Li is deintercalated, and the capacity becomes insufficient.

In the positive electrode active material according to Embodiment 1, the compound represented by Compositional Formula (1) has a crystal structure belonging to a space group FM3-M (rock salt crystal structure).

In Compositional Formula (1), the ratio of Li to Me is denoted by $\{Li_x/Me_y\}$.

In $\{Li_x/Me_y\}$, subscripts x and y satisfy: $1.7 \leq x \leq 2.2$ and $0.8 \leq y \leq 1.3$.

Accordingly, the ratio of Li to Me is theoretically $1.31 \leq \{Li_x/Me_y\} \leq 2.75$ and is larger than 1.

That is, the number of Li atoms for one Me atom is larger than those of known positive electrode active materials, such as $LiMnO_2$.

The compound represented by Compositional Formula (1) is conceived that Li and Me are located at the same site.

Accordingly, the compound represented by Compositional Formula (1) can intercalate and deintercalate a larger amount of Li for one Me atom compared to known positive electrode active materials, such as $LiMnO_2$.

Accordingly, the positive electrode active material for a battery according to Embodiment 1 is suitable for achieving a high-capacity lithium ion battery.

In the layered structure defined by a space group R3-M, the layer structure cannot be maintained when a large amount of Li is extracted and is collapsed.

In contrast, in a rock salt crystal structure defined by the space group FM3-M as in the compound of the present disclosure, even if a large amount of Li is extracted, the structure is not collapsed and can be stably maintained. Consequently, a high-capacity battery can be achieved.

In addition, the positive electrode active material according to Embodiment 1 may mainly include the above-mentioned compound.

Such a structure can achieve a battery having a higher capacity.

Herein, the wording "mainly include" means that the positive electrode active material of Embodiment 1 includes, for example, 90 wt % or more of the above-mentioned compound.

The positive electrode active material of Embodiment 1 mainly includes the above-mentioned compound and may further include, for example, inevitable impurities or a starting material used in the synthesis of the above-mentioned compound, a byproduct, and a decomposition product.

The above-mentioned compound in the positive electrode active material according to Embodiment 1 may be a compound of Compositional Formula (1) satisfying $x+y=\alpha+\beta=3$.

Such a structure can achieve a battery having a higher capacity.

In Embodiment 1, Me may be one element selected from Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr.

Alternatively, Me may be a solid solution of two or more elements selected from Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr.

In Embodiment 1, Me in Compositional Formula (1) may be one element selected from Mn, Co, Ni, and Fe; a solid solution composed of Ni, Co, and Mn; or a solid solution composed of Ni, Co, and Al.

Such a structure can achieve a battery having a higher capacity.

In Embodiment 1, the above-mentioned compound of Compositional Formula (1) may satisfy $1.79 \leq x \leq 2.18$.

Such a structure can achieve a battery having a higher capacity.

In Embodiment 1, the above-mentioned compound of Compositional Formula (1) may satisfy $1.89 \leq x \leq 2$.

Such a structure can achieve a battery having a higher capacity.

In Embodiment 1, the above-mentioned compound of Compositional Formula (1) may satisfy $0.79 \leq \beta \leq 1$.

Such a structure can achieve a battery having a higher capacity.

In Embodiment 1, Me may contain at least one selected from the group consisting of Mn, Co, and Ni.

Such a structure can achieve a battery having a higher capacity and high reliability.

In Embodiment 1, Me may be one element selected from Mn and Co or may be a solid solution composed of Ni, Co, and Mn.

Such a structure can achieve a battery having a higher capacity and high reliability.

In Embodiment 1, the compound of Compositional Formula (1) may satisfy $1.79 \leq x \leq 2.18$, $0.82 \leq y \leq 1.21$, $1.5 \leq \alpha \leq 2.5$, and $0.5 \leq \beta \leq 1.5$.

Such a structure can achieve a battery having a higher capacity and high reliability.

In Embodiment 1, the compound of Compositional Formula (1) may satisfy $x=2$, $y=1$, $1.5 \leq \alpha \leq 2$, and $1 \leq \beta \leq 1.5$.

Such a structure can achieve a battery having a higher capacity and high reliability.

The battery in Embodiment 1 can be constituted as, for example, a lithium ion secondary battery or a nonaqueous electrolyte secondary battery.

That is, in the battery in Embodiment 1, for example, the negative electrode may include a negative electrode active material capable of occluding and releasing lithium (having characteristics of occluding and releasing lithium) or lithium metal.

FIG. 1 is a cross-sectional view illustrating a schematic structure of a battery 1000 as an example of the battery according to Embodiment 1.

As shown in FIG. 1, the battery 1000 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with an electrolytic solution.

The positive electrode 21, the negative electrode 22, and the separator 14 form an electrode group.

The electrode group is accommodated in the case 11.

The case 11 is sealed with the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (e.g., aluminum, stainless steel, or an aluminum alloy).

The case 11 may be used as the positive electrode current collector without disposing the positive electrode current collector 12.

The positive electrode active material layer 13 includes the positive electrode active material in Embodiment 1.

The positive electrode active material layer 13 may optionally include, for example, a conducting agent, an ion conductivity auxiliary, and a binder.

The negative electrode 22 includes a negative electrode current collector 16 and a negative electrode active material layer 17 disposed on the negative electrode current collector 16.

The negative electrode current collector 16 may be made of, for example, a metal material (e.g., copper, nickel, aluminum, stainless steel, or an aluminum alloy).

The sealing plate 15 may be used as the negative electrode current collector without disposing the negative electrode current collector 16.

The negative electrode active material layer 17 includes a negative electrode active material.

The negative electrode active material layer 17 may optionally include, for example, a conducting agent, an ion conductivity auxiliary, and a binder.

Examples of the negative electrode active material include metal materials, carbon materials, oxides, nitrides, tin compounds, and silicon compounds.

The metal material may be an elementary metal or may be an alloy. Examples of the metal material include lithium metal and lithium alloys.

Examples of the carbon material include natural graphite, coke, carbon during graphitization, carbon fibers, spherical carbon, artificial graphite, and amorphous carbon.

From the viewpoint of capacity density, silicon (Si), tin (Sn), silicon compounds, and tin compounds can be suitably used. The silicon compounds and the tin compounds may be alloys or solid solutions.

Examples of the silicon compound include $SiO_x$ (where $0.05<x<1.95$). A compound (alloy or solid solution) prepared by partially replacing silicon in $SiO_x$ with another element also can be used. Herein, the another element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (where, $0<x<2$), $SnO_2$, and $SnSiO_3$. These tin compounds may be used alone or in combination of two or more thereof.

The negative electrode active material may have any shape. A negative electrode active material having a known shape (such as particulate or fibrous shape) can be used.

The negative electrode active material layer 17 may be compensated (occluded) with lithium by any method. Specifically, for example, (a) lithium is deposited on the negative electrode active material layer 17 by a gas phase method, such as vacuum deposition, or (b) lithium metal foil and the negative electrode active material layer 17 are brought into contact with each other and are heated. In both methods, lithium diffuses into the negative electrode active material layer 17 by heat. In another method, lithium is electrochemically occluded in the negative electrode active material layer 17. Specifically, a battery is assembled with a lithium-free negative electrode 22 and lithium metal foil (positive electrode). Subsequently, the battery is charged such that lithium is occluded in the negative electrode 22.

Examples of the binder of the positive electrode 21 or the negative electrode 22 include poly(vinylidene fluoride), polytetrafluoroethylene, polyethylene, polypropylene, aramid resins, polyamides, polyimides, polyamideimides, polyacrylonitriles, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), poly(vinyl pyrrolidone), polyethers, polyethersulfones, hexafluoropolypropylene, styrene butadiene rubber, and carboxymethyl cellulose. Alternatively, the binder may be a copolymer of two or more materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene.

Examples of the conducting agent of the positive electrode 21 or the negative electrode 22 include graphite, carbon black, conductive fibers, graphite fluoride, metal powders, conductive whiskers, conductive metal oxides, and organic conductive materials. Examples of the graphite include natural graphite and artificial graphite. Examples of the carbon black include acetylene black, Ketchen black (registered trademark), channel black, furnace black, lamp black, and thermal black. Examples of the metal powder include aluminum powder. Examples of the conductive whisker include zinc oxide whiskers and potassium titanate whiskers. Examples of the conductive metal oxide include titanium oxide. Examples of the organic conductive material include phenylene derivatives.

As the separator 14, materials having a high ion permeability and a sufficient mechanical strength can be used. Examples of such a material include porous thin film, woven fabric, and nonwoven fabric. Specifically, the separator 14 is desirably made of a polyolefin, such as polypropylene and polyethylene. A polyolefin separator 14 not only has excellent durability but also can exhibit a shutdown function when excessively heated. The separator 14 has a thickness in a range of, for example, 10 to 300 µm (or 10 to 40 µm). The separator 14 may be a monolayer film composed of one material or may be a composite film (or multilayer film) composed of two or more materials. The separator 14 has a porosity in a range of, for example, 30% to 70% (or 35% to 60%). The term "porosity" refers to the rate of the hole volume to the total volume of the separator 14. The "porosity" is measured by, for example, a mercury press-in method.

The electrolytic solution according to Embodiment 1 includes an additive.

The content of the additive may be 0.05 wt % or more and 5 wt % or less based on the total amount of the electrolytic solution.

Such a structure can achieve a battery having a higher capacity and high reliability.

Examples of the additive in the electrolytic solution include dinitrile compounds and diisocyanate compounds.

The dinitrile compound may be any compound having two nitrile groups, and examples of the dinitrile compound include succinonitrile, glutaronitrile, adiponitrile, 2-methyladiponitrile, 3-methyladiponitrile, pimelonitrile, suberonitrile, azelanitrile, and their derivatives.

In particular, the use of adiponitrile, pimelonitrile, or suberonitrile can increase the reliability of the battery.

As described above, the additive may include a dinitrile compound.

In such a case, the dinitrile compound may have 4 to 8 carbon atoms in one molecule.

Such a structure can achieve a battery having a higher capacity and high reliability.

The dinitrile compound may have 6 to 8 carbon atoms in one molecule.

Such a structure can achieve a battery having a higher capacity and high reliability.

The dinitrile compound may be at least one selected from the group consisting of adiponitrile and pimelonitrile.

Such a structure can achieve a battery having a higher capacity and high reliability.

The diisocyanate compound may be any compound having two isocyanate groups. Examples of the diisocyanate compound include tetramethylene diisocyanate, pentamethylene diisocyanate, hexamethylene diisocyanate (hereinafter, may be referred to as HMDI), 2-methylhexamethylene diisocyanate, 3-methylhexamethylene diisocyanate, and their derivatives.

As described above, the additive may include a diisocyanate compound.

In such a case, the diisocyanate compound may have 4 to 8 carbon atoms in one molecule.

Such a structure can achieve a battery having a higher capacity and high reliability.

The diisocyanate compound may have 6 to 8 carbon atoms in one molecule.

Such a structure can achieve a battery having a higher capacity and high reliability.

The diisocyanate compound may be hexamethylene diisocyanate.

Such a structure can achieve a battery having a higher capacity and high reliability.

The electrolytic solution according to Embodiment 1 may further include a lithium salt.

Examples of the lithium salt dissolved in the nonaqueous solvent include $LiClO_4$, $LiBF_4$, $LiPF_6$, $LiN(SO_2F)_2$, $LiN(SO_2CF)_2$, and lithium bis(oxalate)borate (LiBOB). The lithium salt may be at least one selected from the group consisting of these salts.

Use of $LiPF_5$ as the lithium salt can improve the ionic conductivity or reliability.

The molar content of the lithium salt in the electrolytic solution is not particularly limited and may be 0.5 mol/L or more and 2.0 mol/L or less.

The electrolytic solution according to Embodiment 1 may further include a nonaqueous solvent.

The nonaqueous solvent in the electrolytic solution may be at least one selected from the group consisting of carbonates, carboxylates, ethers, and nitriles.

Such a structure can achieve a battery having a higher capacity and high reliability.

In such a case, the electrolytic solution may further include fluoroethylene carbonate.

Such a structure can achieve a battery having a higher capacity and high reliability.

Examples of the nonaqueous solvent in the electrolytic solution include cyclic carbonates, linear carbonates, cyclic carboxylates, linear carboxylates, linear nitriles, cyclic ethers, and linear ethers.

The ionic conductivity of the electrolytic solution can be improved by mixing a cyclic solvent and a linear solvent at an appropriate ratio.

Use of a carbonate or a carboxylate can improve the reliability.

Examples of the cyclic carbonate include ethylene carbonate, fluoroethylene carbonate, propylene carbonate, butylene carbonate, vinylene carbonate, vinylethylene carbonate, and their derivatives. These cyclic carbonates may be used alone or in combination of two or more thereof.

The ionic conductivity of the electrolytic solution can be improved by using at least one selected from the group consisting of ethylene carbonate, fluoroethylene carbonate, and propylene carbonate.

The electrolytic solution including fluoroethylene carbonate can have improved stability on the negative electrode.

Examples of the linear carbonate include dimethyl carbonate, ethyl methyl carbonate, and diethyl carbonate. In these carbonates, a part of hydrogen atoms may be replaced with fluoro groups. These carbonates may be used alone or in combination of two or more thereof.

Examples of the cyclic carboxylate include γ-butyrolactone and γ-valerolactone. In these carboxylates, a part of hydrogen atoms may be replaced with fluoro groups. These carboxylates may be used alone or in combination of two or more thereof.

Examples of the linear carboxylate include methyl acetate, ethyl acetate, propyl acetate, methyl propionate, ethyl propionate, and propyl propionate. In these carboxylates, a part of hydrogen atoms may be replaced with fluoro groups. These carboxylates may be used alone or in combination of two or more thereof.

Examples of the linear nitrile include acetonitrile, propionitrile, butyronitrile, valeronitrile, isobutyronitrile, and pivalonitrile. In these nitriles, a part of hydrogen atoms may be replaced with fluoro groups. These nitriles may be used alone or in combination of two or more thereof.

Examples of the cyclic ether include 1,3-dioxolane, 1,4-dioxolane, tetrahydrofuran, and 2-methyl tetrahydrofuran. In these ethers, a part of hydrogen atoms may be replaced with fluoro groups. These ethers may be used alone or in combination of two or more thereof.

Examples of the linear ether include 1,2-dimethoxyethane, dimethyl ether, diethyl ether, dipropyl ether, ethyl methyl ether, diethylene glycol dimethyl ether, diethylene glycol diethyl ether, and diethylene glycol dibutyl ether. In these ethers, a part of hydrogen atoms may be replaced with fluoro groups. These ethers may be used alone or in combination of two or more thereof.

The battery according to Embodiment 1 can be formed into various shapes, for example, a coin-like, cylindrical, rectangular, sheet-like, button-like, flat, or laminar battery.

Method of Producing Compound

An example of the method of producing the above-mentioned compound included in the positive electrode active material of Embodiment 1 will now be described.

The compound represented by Compositional Formula (1) can be produced by, for example, the following method.

A raw material including Li, a raw material including F, and a raw material including Me are prepared. Examples of the Li-including raw material include oxides, such as $Li_2O$ and $Li_2O_2$; salts, such as LiF, $Li_2CO_3$, and LiOH; and lithium-transition metal composite oxides, such as $LiMeO_2$ and $LiMe_2O_4$. Examples of the F-including raw material include LiF and transition metal fluorides. Examples of the Me-including raw material include oxides in various oxidation states, such as $Me_2O_3$; salts, such as $MeCO_3$ and $MeNO_3$; hydroxides, such as $Me(OH)_2$ and MeOOH; and lithium-transition metal composite oxides, such as $LiMeO_2$ and $LiMe_2O_4$. For example, when Me is Mn, examples of the Mn-including raw material include manganese oxides in various oxidation states, such as $Mn_2O_3$; salts, such as $MnCO_3$ and $MnNO_3$; hydroxides, such as $Mn(OH)_2$ and MnOOH; and lithium-transition metal composite oxides, such as $LiMnO_2$ and $LiMn_2O_4$.

These materials are weighed so as to give a molar ratio shown by Compositional Formula (1).

On this occasion, subscripts "x, y, α, and β" in Compositional Formula (1) can be varied within the range shown by Compositional Formula (1).

The weighed raw materials are, for example, mixed by a dry processor a wet process for a mechanochemical reaction for 10 hours or more to prepare a compound represented by Compositional Formula (1). The mixing is performed with, for example, a mixer, such as a ball mill.

The compound substantially represented by Compositional Formula (1) can be prepared by adjusting the raw materials and the mixing conditions for the raw material mixture.

The use of a lithium-transition metal composite oxide as a precursor can further decrease the energy for mixing the elements. Consequently, the compound represented by Compositional Formula (1) can have a higher purity.

The composition of the resulting compound represented by Compositional Formula (1) can be determined by, for example, inductively coupled plasma (ICP) emission spectral analysis and an inert gas fusion-infrared absorption method.

The compound represented by Compositional Formula (1) can be identified by determining the space group of the crystal structure by powder X-ray analysis.

As described above, the method of producing a positive electrode active material according to an aspect of Embodiment 1 involves a step (a) of preparing raw materials and a step (b) of a mechanochemical reaction of the raw materials to prepare a positive electrode active material.

The step (a) may involve a step of mixing a raw material including Li and F and a raw material including Me at a molar ratio of Li to Me of 1.31 or more and 2.33 or less to prepare a raw material mixture.

On this occasion, the step (a) may involve a step of producing a lithium-transition metal composite oxide serving as a raw material by a known method.

The step (a) may involve a step of mixing raw materials at a molar ratio of Li to Me of 1.7 or more and 2.0 or less to prepare a raw material mixture.

The step (b) may involve a step of mechanochemically reacting raw materials with a ball mill.

As described above, the compound represented by Compositional Formula (1) can be synthesized by a mechanochemical reaction of precursors (e.g., LiF, $Li_2O$, oxidized transition metal, and lithium-transition metal composite) with a planetary ball mill.

On this occasion, the compound can include a larger amount of Li by adjusting the mixing ratio of the precursors.

In contrast, in a solid phase method, the precursors are decomposed into more stable compounds.

That is, the production process involving a reaction of the precursors by a solid phase method cannot produce the compound having a crystal structure belonging to a space group FM3-M and represented by Compositional Formula (1).

EXAMPLES

Example 1

Synthesis of Positive Electrode Active Material

LiF and $LiMnO_2$ were weighed at a molar ratio LiF/$LiMnO_2$ of 1.0/1.0.

The resulting raw material and an appropriate amount of zirconia balls of 3 mm diameter were put in a 45-cc zirconia container, and the container was sealed in an argon glove box.

The sealed container was taken out from the argon glove box, followed by treatment with a planetary ball mill at 600 rpm for 30 hours.

The resulting compound was subjected to powder X-ray diffraction analysis.

Figure 2:
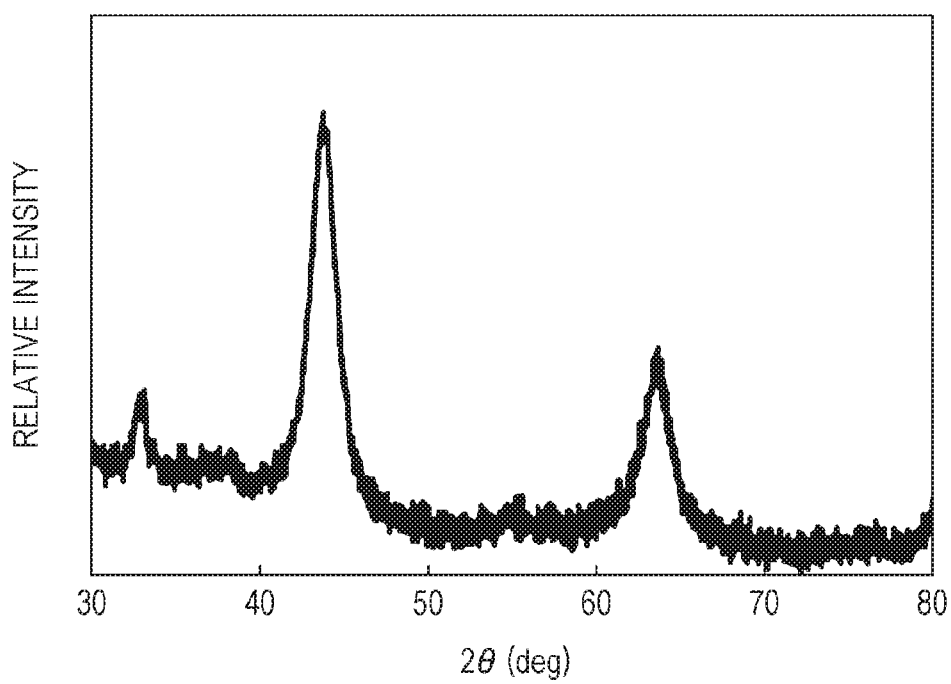
FIG. 2 is a powder X-ray diffraction chart of the positive electrode active material of Example 1.

FIG. 2 shows the results of the analysis.

The resulting compound was in a space group FM3-M.

The composition of the resulting compound was determined by ICP emission spectral analysis and an inert gas fusion-infrared absorption method.

The results demonstrated that the compound had a composition of $Li_2MnO_2F$.

Production of Positive Electrode Plate

Subsequently, 70 parts by mass of the resulting compound, 20 parts by mass of acetylene black, 10 parts by mass of poly(vinylidene fluoride), and an appropriate amount of N-methyl-2-pyrrolidone were mixed to prepare a positive electrode mixture slurry.

The positive electrode mixture slurry was applied to one surface of a positive electrode current collector formed of aluminum foil having a thickness of 15 μm and was then dried in vacuum at 105° C. The positive electrode mixture slurry was thus dried and rolled and formed into a 90-μm-thick positive electrode plate having a positive electrode active material layer.

Preparation of Nonaqueous Electrolytic Solution $LiPF_6$ (CAS No. 21324-40-3) serving as a lithium salt was dissolved at a concentration of 1.0 mol/L in a solvent mixture (volume ratio: 20:80) of ethylene carbonate (hereinafter, referred to as EC) (CAS No. 96-49-1) and ethyl methyl carbonate (hereinafter, referred to as EMC) (CAS No. 623-53-0), and 2 wt % of adiponitrile (CAS No. 111-69-3) serving as an additive was further dissolved therein to prepare a nonaqueous electrolytic solution. In the adiponitrile, the number of carbon atoms included in one molecule of the dinitrile compound is six.

Formation of Sheet Battery

Figure 3:
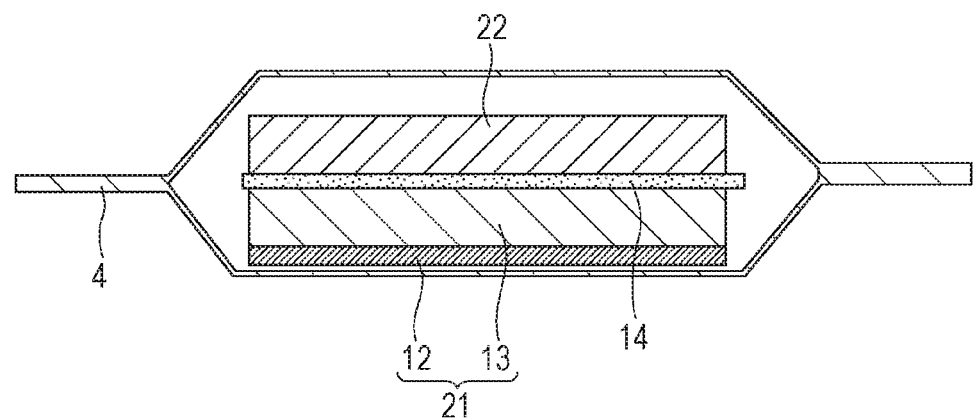
FIG. 3 is a cross-sectional view illustrating a schematic structure of the battery in Example 1.

FIG. 3 is a cross-sectional view illustrating a schematic structure of the battery in Example 1.

Figure 4:
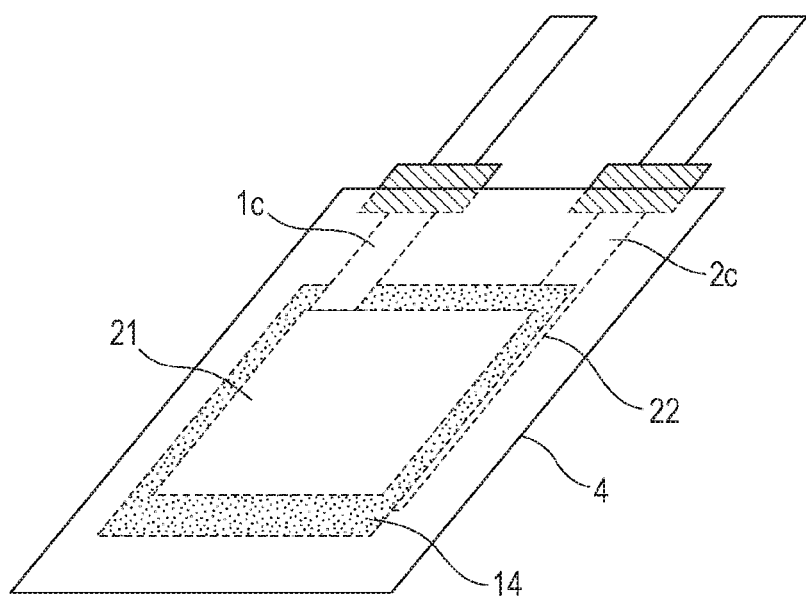
FIG. 4 is a perspective view illustrating a schematic structure of the battery in Example 1.

FIG. 4 is a perspective view illustrating a schematic structure of the battery in Example 1.

In the sheet battery of Example 1, the electrode plate group is accommodated in an outer packaging 4. The electrode plate group includes a positive electrode 21, a negative electrode 22, and a separator 14. The positive electrode 21 is composed of a positive electrode current collector 12 and a positive electrode active material layer 13 (positive electrode mixture layer). The positive electrode active material layer 13 is disposed on the positive electrode current collector 12. The positive electrode 21 and the negative electrode 22 face each other with the separator 14 interposed therebetween to form the electrode plate group.

The positive electrode current collector 12 is connected to a positive electrode tab lead 1c. The negative electrode 22 is connected to a negative electrode tab lead 2c. The positive electrode tab lead 1c and the negative electrode tab lead 2c extend to the outside of the outer packaging 4.

A heat-bonded resin is arranged between the positive electrode tab lead 1c and the outer packaging 4. A heat-bonded resin is arranged between the negative electrode tab lead 2c and the outer packaging 4.

Figure 5:
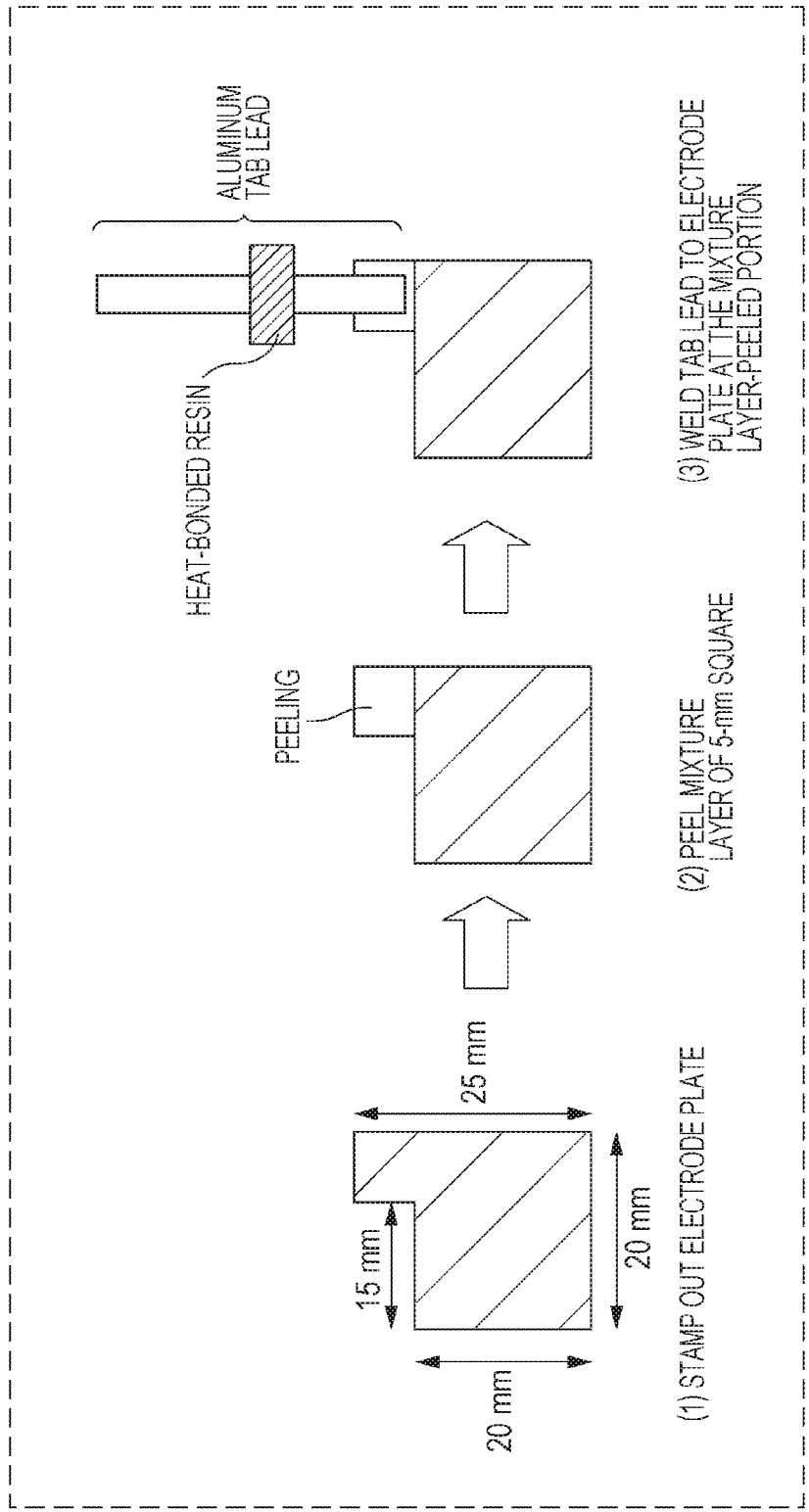
FIG. 5 is a diagram illustrating a schematic structure of the positive electrode plate in Example 1 and a method of producing the plate.

FIG. 5 is a diagram illustrating a schematic structure of the positive electrode plate in Example 1 and a method of producing the plate.

Figure 6:
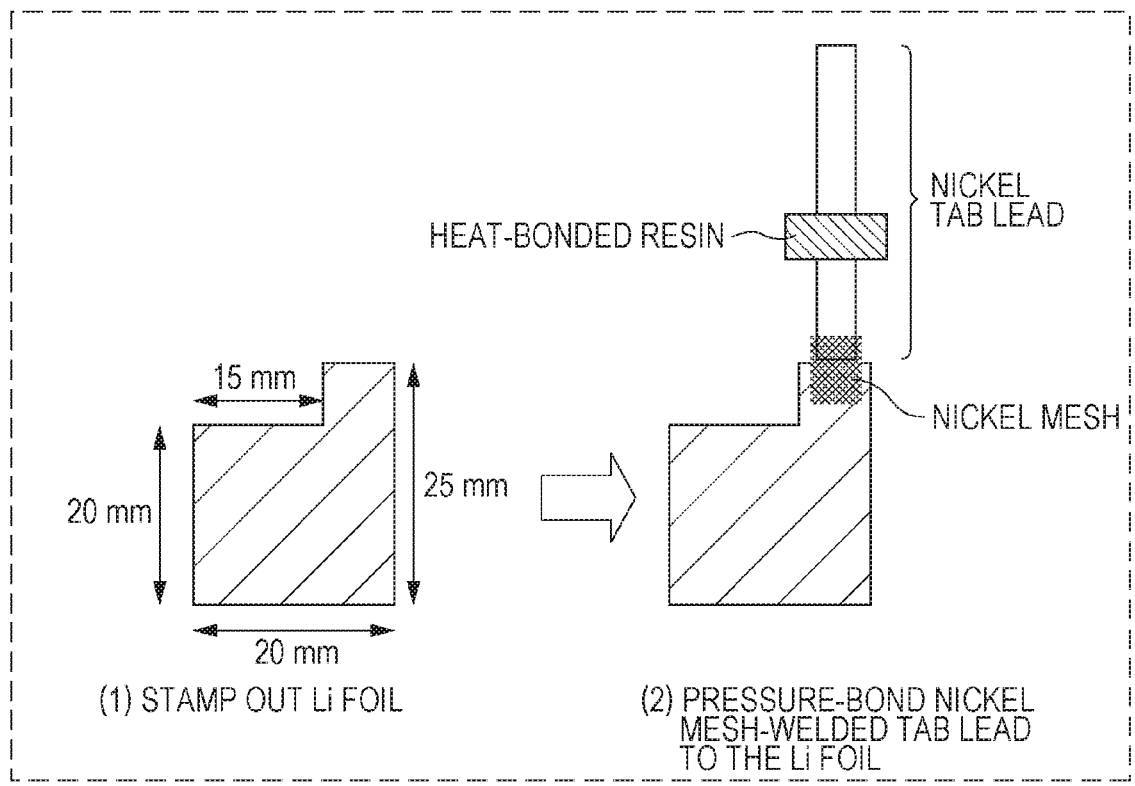
FIG. 6 is a diagram illustrating a schematic structure of the negative electrode plate in Example 1 and a method of producing the plate.

FIG. 6 is a diagram illustrating a schematic structure of the negative electrode plate in Example 1 and a method of producing the plate.

Figure 7:
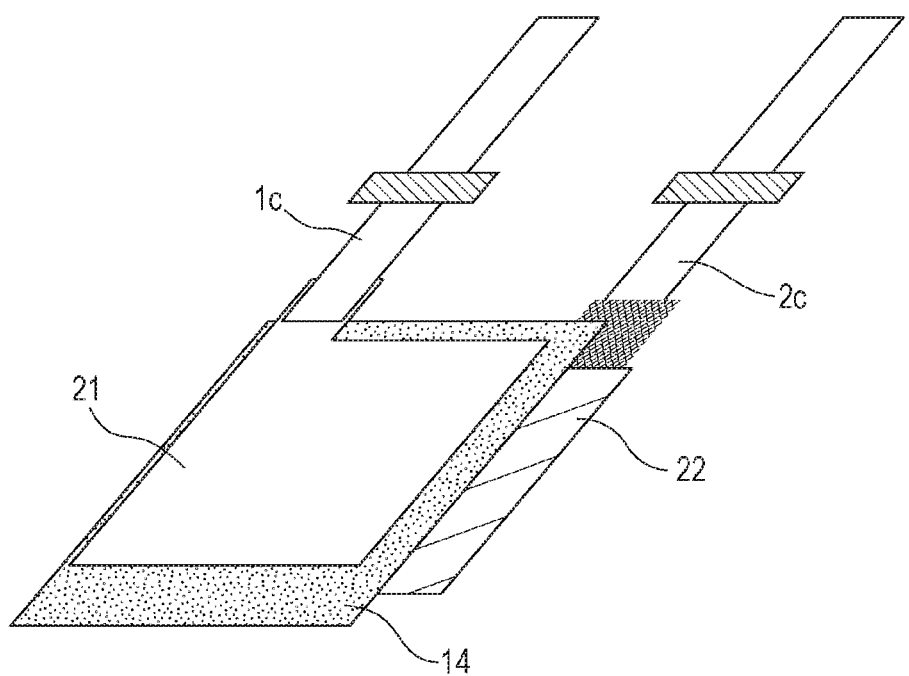
FIG. 7 is a perspective view illustrating a schematic structure of the battery in Example 1.

FIG. 7 is a perspective view illustrating a schematic structure of the battery in Example 1.

The positive electrode plate was processed as shown in FIG. 5. The electrode mixture area was 4 cm$^2$ as shown in FIG. 5.

The negative electrode plate was processed as shown in FIG. 6. The negative electrode used was lithium metal foil having a thickness of 300 μm.

As shown in FIG. 6, the positive electrode and the negative electrode were placed so as to face each other with a separator (polypropylene, thickness: 30 μm) therebetween. Subsequently, 120×120 mm square aluminum laminate (thickness: 100 μm) was folded, and the 120 mm edges were heat-sealed at 230° C. into a tubular form of 120×60 mm. The electrode group comprising the facing electrodes as shown in FIG. 7 was inserted into the tubular aluminum laminate from the 60 mm edge. As shown in FIG. 3, the edge of the aluminum laminate was aligned with the heat-bonded resins of the tab leads and was heat-sealed at 230° C.; 0.35 cc of a nonaqueous electrolytic solution was then poured in the tubular aluminum laminate from the edge not sealed in dry air having a dew point of −60° C., followed by being left to stand under a vacuum of 0.06 MPa for 15 minutes such that the electrolytic solution impregnated into the electrode mixture; and finally, the edge of the laminate from which the solution was poured was heat-sealed at 230° C.

As described above, a lithium secondary battery of Example 1 was produced.

Example 2

Adiponitrile as the additive was used at a concentration of 0.2 wt %.

A lithium secondary battery was produced as in Example 1 except for the above.

Example 3

Pimelonitrile (CAS No. 646-20-8) was used as the additive instead of adiponitrile. In pimelonitrile, the number of carbon atoms included in one molecule of the dinitrile compound is seven.

A lithium secondary battery was produced as in Example 1 except for the above.

Example 4

Hexamethylene diisocyanate (hereinafter, referred to as HMDI) (CAS No. 822-06-0) was used as the additive instead of adiponitrile. In hexamethylene diisocyanate, the number of carbon atoms included in one molecule of the dinitrile compound is eight.

A lithium secondary battery was produced as in Example 1 except for the above.

Example 5

A solvent mixture (volume ratio: 10:10:80) of EC, fluoroethylene carbonate (hereinafter, referred to as FEC) (CAS No. 114435-02-8), and EMC was used as the nonaqueous solvent in the nonaqueous electrolytic solution, instead of the solvent mixture of EC and EMC.

A lithium secondary battery was produced as in Example 1 except for the above.

Example 6

A solvent mixture (volume ratio: 20:80) of FEC and methyl 3,3,3-trifluoropropionate (hereinafter, referred to as FMP) (CAS No. 18830-44-9) was used as the nonaqueous solvent in the nonaqueous electrolytic solution, instead of the solvent mixture of EC and EMC.

A lithium secondary battery was produced as in Example 1 except for the above.

Example 7

As the positive electrode active material, $Li_2Ni_{0.33}Co_{0.33}Mn_{0.33}O_2F$ having a crystal structure belonging to a space group FM3-M was used instead of $Li_2MnO_2F$.

A lithium secondary battery was produced as in Example 1 except for the above.

The positive electrode active material $Li_2Ni_{0.33}Co_{033}Mn_{0.33}O_2F$ was synthesized by the same procedure as that of the synthesis of $Li_2MnO_2F$ except that $LiNi_{0.33}Co_{0.33}Mn_{0.33}O_2$ was used as a raw material.

Example 8

As the positive electrode active material, $Li_2CoO_2F$ having a crystal structure belonging to a space group FM3-M was used instead of $Li_2MnO_2F$.

A lithium secondary battery was produced as in Example 1 except for the above.

The positive electrode active material $Li_2CO_2F$ was synthesized by the same procedure as that of the synthesis of $Li_2MnO_2F$ except that $LiCoO_2$ was used as a raw material.

Example 9

As the positive electrode active material, $Li_2MnO_{1.5}F_{1.5}$ having a crystal structure belonging to a space group FM3-M was used instead of $Li_2MnO_2F$.

A lithium secondary battery was produced as in Example 1 except for the above.

The positive electrode active material $Li_2MnO_{1.5}F_{1.5}$ was synthesized by the same procedure as that of the synthesis of $Li_2MnO_2F$ except that $Li_2O$, LiF, MnO, and $Mn_2O_3$ were used as raw materials at a molar ratio $Li_2O$/LiF/MnO/$Mn_2O_3$ of 1/6/2/1.

Comparative Example 1

Adiponitrile was not dissolved in the nonaqueous electrolytic solution.
A lithium secondary battery was produced as in Example 1 except for the above.

Comparative Example 2

Adiponitrile was not dissolved in the nonaqueous electrolytic solution.
A lithium secondary battery was produced as in Example 7 except for the above.

Comparative Example 3

Adiponitrile was not dissolved in the nonaqueous electrolytic solution.
A lithium secondary battery was produced as in Example 8 except for the above.

Comparative Example 4

Adiponitrile was not dissolved in the nonaqueous electrolytic solution.
A lithium secondary battery was produced as in Example 9 except for the above.

Comparative Example 5

As the positive electrode active material, $LiCoO_2$ having a crystal structure belonging to a space group R3-M was used instead of $Li_2MnO_2F$. The positive electrode active material $LiCoO_2$ was synthesized in accordance with a known procedure.
A lithium secondary battery was produced as in Example 1 except for the above.

Evaluation of Battery

In the evaluation of the batteries produced as described above, each battery was sandwiched by stainless steel plates (thickness: 2 mm) of 80×80 cm with the laminate therebetween, and the electrode plates were applied with a pressure of 0.2 MPa by a U-shaped clamp. The evaluation was all performed in a thermostat chamber of 25° C.

Charging and discharging at a constant current of 0.1 mA were repeated two cycles such that the positive electrode is completely impregnated with the electrolytic solution. The charging and the discharging were stopped at battery voltages of 4.7 V and 1.5 V, respectively, and the battery was left to stand during the interval between the charging and the discharging for 20 minutes at an open circuit.

Subsequently, one cycle of charging and discharging was further performed under the same conditions. The discharge efficiency (the value obtained by dividing the discharge capacity by the charge capacity) of this third cycle was used as an index of reliability.

These results are shown in Table together with the results of discharge capacity per weight of the positive electrode active material.

TABLE

| | Positive electrode active material | Nonaqueous solvent | Additive | Additive concentration (wt %) | Discharge capacity (mAh/g) | Discharge efficiency |
|---|---|---|---|---|---|---|
| Example 1 | $Li_2MnO_2F$ | EC + EMC | Adiponitrile | 2.0 | 277 | 89% |
| Example 2 | $Li_2MnO_2F$ | EC + EMC | Adiponitrile | 0.2 | 278 | 90% |
| Example 3 | $Li_2MnO_2F$ | EC + EMC | Pimelonitrile | 2.0 | 276 | 89% |
| Example 4 | $Li_2MnO_2F$ | EC + EMC | HMD1 | 2.0 | 280 | 89% |
| Example 5 | $Li_2MnO_2F$ | EC + FEC + EMC | Adiponitrile | 2.0 | 280 | 91% |
| Example 6 | $Li_2MnO_2F$ | FEC + FMP | Adiponitrile | 2.0 | 280 | 92% |
| Example 7 | $Li_2Ni_{0.33}Co_{0.33}Mn_{0.33}O_2F$ | EC + EMC | Adiponitrile | 2.0 | 271 | 89% |
| Example 8 | $Li_2CoO_2F$ | EC + EMC | Adiponitrile | 2.0 | 244 | 88% |
| Example 9 | $Li_2MnO_{1.5}F_{1.5}$ | EC + EMC | Adiponitrile | 2.0 | 275 | 90% |
| Comparative Example 1 | $Li_2MnO_2F$ | EC + EMC | None | — | 275 | 87% |
| Comparative Example 2 | $Li_2Ni_{0.33}Co_{0.33}Mn_{0.33}O_2F$ | EC + EMC | None | — | 271 | 85% |
| Comparative Example 3 | $Li_2CoO_2F$ | EC + EMC | None | — | 242 | 85% |
| Comparative Example 4 | $Li_2MnO_{1.5}F_{1.5}$ | EC + EMC | None | — | 273 | 87% |
| Comparative Example 5 | $LiCoO_2$ | EC + EMC | Adiponitrile | 0.1 | 200 | 89% |

As shown in Table, the discharge efficiency of each battery of Examples 1 to 6 is higher than that of the battery of Comparative Example 1.

This is probably caused by that in the positive electrode active material-nonaqueous solvent interfaces formed in the batteries of Examples 1 to 6, side reactions hardly occur, compared to the battery of Comparative Example 1.

Similarly, the batteries of Examples 7 to 9 have higher discharge efficiencies compared to the batteries of Comparative Examples 2 to 4, respectively.

Furthermore, the batteries of Examples 1 to 9 have higher discharge capacities compared to that of Comparative Example 5.

In addition, the comparison of Example 4 and Example 5 demonstrates that the electrolytic solution according to the present disclosure further including FEC further improves the discharge efficiency.

The results described above demonstrate that the lithium secondary battery according to the present disclosure has a high capacity and a high discharge efficiency (reliability).

The battery of the present disclosure can be suitably used as, for example, a lithium secondary battery.

What is claimed is:

1. A battery comprising:
a positive electrode including a positive electrode active material;
a negative electrode; and
an electrolytic solution including an additive, wherein
the positive electrode active material includes a compound having a crystal structure belonging to a space group FM-3M and represented by Compositional Formula (1):

$$Li_xMe_yO_\alpha F_\beta \quad (1)$$

where Me is at least one element selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr; and
subscripts x, y, α, and β satisfy the following requirements:
x=2;
y=1;
1.5≤α≤2; and
1≤β≤1.5,
the additive is at least one selected from the group consisting of dinitrile compounds and diisocyanate compounds, and
the content of the additive is 0.05 wt % or more and 5 wt % or less based on the total amount of the electrolytic solution.

2. The battery according to claim 1, wherein
the compound satisfies:

$$x+y=\alpha+\beta=3.$$

3. The battery according to claim 1, wherein
the additive includes a dinitrile compound, and
the dinitrile compound has 4 to 8 carbon atoms.

4. The battery according to claim 3, wherein
the dinitrile compound has 6 to 8 carbon atoms.

5. The battery according to claim 4, wherein
the dinitrile compound is at least one selected from the group consisting of adiponitrile and pimelonitrile.

6. The battery according to claim 1, wherein
the additive includes the diisocyanate compound, and
the diisocyanate compound has 4 to 8 carbon atoms.

7. The battery according to claim 6, wherein
the diisocyanate compound has 6 to 8 carbon atoms.

8. The battery according to claim 7, wherein
the diisocyanate compound is hexamethylene diisocyanate.

9. The battery according to claim 1, wherein
Me includes at least one selected from the group consisting of Mn, Co, and Ni.

10. The battery according to claim 9, wherein
Me is an element selected from Mn and Co or is a solid solution composed of Ni, Co, and Mn.

11. The battery according to claim 1, wherein
the positive electrode active material includes 90 wt % or more of the compound.

12. The battery according to claim 1, wherein
the electrolytic solution includes a lithium salt; and
the lithium salt is at least one selected from the group consisting of $LiBF_4$, $LiPF_6$, $LiN(SO_2CF_3)_2$, $LiN(SO_2F)_2$, and lithium bis(oxalate)borate.

13. The battery according to claim 1, wherein
the electrolytic solution includes a nonaqueous solvent, and
the nonaqueous solvent is at least one selected from the group consisting of carbonates, carboxylates, ethers, and nitriles.

14. The battery according to claim 13, wherein
the electrolytic solution includes fluoroethylene carbonate.

* * * * *